United States Patent
Weston et al.

(10) Patent No.: US 11,745,559 B2
(45) Date of Patent: Sep. 5, 2023

(54) SYSTEM AND METHOD FOR ISOLATING MOTOR VEHICLE INTERIOR FROM POOR OUTDOOR AIR QUALITY

(71) Applicant: Ford Global Technologies, LLC, Dearborn, MI (US)

(72) Inventors: Keith Weston, Canton, MI (US); Brendan Diamond, Grosse Pointe, MI (US); Michael Alan McNees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 580 days.

(21) Appl. No.: 17/070,084

(22) Filed: Oct. 14, 2020

(65) Prior Publication Data
US 2022/0111701 A1    Apr. 14, 2022

(51) Int. Cl.
| | |
|---|---|
| G06N 3/08 | (2023.01) |
| B60H 1/00 | (2006.01) |
| H04W 4/021 | (2018.01) |
| E05F 15/70 | (2015.01) |

(52) U.S. Cl.
CPC ......... *B60H 1/00771* (2013.01); *B60H 1/008* (2013.01); *B60H 1/00807* (2013.01); *B60H 1/00849* (2013.01); *E05F 15/70* (2015.01); *G06N 3/08* (2013.01); *H04W 4/021* (2013.01); *E05Y 2400/45* (2013.01); *E05Y 2900/542* (2013.01); *E05Y 2900/55* (2013.01)

(58) Field of Classification Search
CPC .......................... B60H 1/00771; B60H 1/008; B60H 1/00807; B60H 1/00849; E05F 15/70; G06N 3/08; H04W 4/021; E05Y 2400/45; E05Y 2900/542; E05Y 2900/55
See application file for complete search history.

(56) References Cited

U.S. PATENT DOCUMENTS

| | | |
|---|---|---|
| 10,232,680 B2 | 3/2019 | Park et al. |
| 2018/0334013 A1 | 11/2018 | Koravadi |
| 2019/0308487 A1 | 10/2019 | Badger et al. |

FOREIGN PATENT DOCUMENTS

| | | |
|---|---|---|
| JP | 2003335121 A | 11/2003 |
| KR | 20180101881 A | 9/2018 |

*Primary Examiner* — Mathew Franklin Gordon
(74) *Attorney, Agent, or Firm* — Vichit Chea; Carlson, Gaskey & Olds, P.C.

(57) ABSTRACT

This disclosure relates to a system and method for isolating an interior of a motor vehicle from poor outdoor air quality. More particularly, this disclosure relates to a system and method configured to identify conditions associated with poor outdoor air quality and to respond to those conditions by isolating the interior of the motor vehicle from the outdoor environment. An example system includes a selector configured to permit a user to select a drive mode of the motor vehicle, a location system configured to detect a location of the motor vehicle, and a controller configured to issue one or more commands to isolate an interior of the motor vehicle from an environment outside the motor vehicle based on either a selected drive mode or a detected location.

20 Claims, 2 Drawing Sheets

SYSTEM AND METHOD FOR ISOLATING MOTOR VEHICLE INTERIOR FROM POOR OUTDOOR AIR QUALITY

TECHNICAL FIELD

This disclosure relates to a system and method for isolating an interior of a motor vehicle from poor outdoor air quality.

BACKGROUND

Off-roading is the activity or sport of driving a motor vehicle over relatively rough terrain, including unsurfaced roads or tracks, such as those made of materials such as sand, gravel, riverbeds, mud, snow, rocks, and/or other natural terrain. A number of different types of motor vehicles are suitable for off-road use, including sport utility vehicles (SUVs) and pickup trucks, and other such vehicles having relatively high ground clearances, robust tires, and a relatively powerful drive-train. Some vehicle manufacturers offer vehicles specifically designed for off-road use.

SUMMARY

A system for a motor vehicle according to an exemplary aspect of the present disclosure includes, among other things, a selector configured to permit a user to select a drive mode of the motor vehicle, a location system configured to detect a location of the motor vehicle, and a controller configured to issue a command to isolate an interior of the motor vehicle from an environment outside the motor vehicle based on either a selected drive mode or a detected location.

In a further non-limiting embodiment of the foregoing system, the controller is configured to issue a command to isolate the interior of the motor vehicle based on either a user selecting a drive mode corresponding to off-roading or the detected location corresponding to an off-roading area.

In a further non-limiting embodiment of any of the foregoing systems, the system includes a climate control system of the motor vehicle selectively operable in a recirculation mode, and the controller is configured to issue a command to cause the climate control system to operate in the recirculation mode based on either the selected drive mode or the detected location.

In a further non-limiting embodiment of any of the foregoing systems, the system includes a power window configured to move between an open position and a closed position, and the controller is configured to issue a command to cause the power window to move to the closed position based on either the selected drive mode or the detected location.

In a further non-limiting embodiment of any of the foregoing systems, the power window is either a window of a side door of the motor vehicle or a moonroof.

In a further non-limiting embodiment of any of the foregoing systems, the power window is one of a plurality of power windows each associated with an individual side door of the motor vehicle, the motor vehicle further includes a moonroof configured to move between an open position and a closed position, and the controller is configured to issue a command to cause each of the power windows and the moonroof to move to the closed position based on either the selected drive mode or the detected location.

In a further non-limiting embodiment of any of the foregoing systems, the system includes a camera, and the controller is configured to issue a command to isolate the interior of the motor vehicle based on an image from the camera indicating a poor air quality condition.

In a further non-limiting embodiment of any of the foregoing systems, the system includes a transceiver, and the transceiver is configured to send information corresponding to the poor air quality condition.

In a further non-limiting embodiment of any of the foregoing systems, the controller is configured to issue a command to isolate the interior of the motor vehicle when the detected location includes a designated off-roading area.

In a further non-limiting embodiment of any of the foregoing systems, the location system is configured to detect that the motor vehicle has entered a geofence corresponding to the off-roading area.

In a further non-limiting embodiment of any of the foregoing systems, the controller is configured to issue a command to isolate the interior of the motor vehicle when the detected location exceeds a predetermined maximum threshold distance from a mapped roadway.

In a further non-limiting embodiment of any of the foregoing systems, the system includes a neural network configured to monitor operation of the motor vehicle over time to learn conditions associated with poor air quality, and the neural network is configured to train the controller to selectively isolate interior of the motor vehicle based on the learned conditions.

In a further non-limiting embodiment of any of the foregoing systems, the system includes a transceiver configured to receive environmental data, and the controller is configured to identify a poor air quality condition based on the received environmental data and to issue a command to isolate the interior of the motor vehicle based on the identified poor air quality condition.

A system for a motor vehicle according to another exemplary aspect of the present disclosure includes, among other things, a plurality of power windows, each of the power windows associated with an individual side door of the motor vehicle and moveable between an open position and a closed position. The system further includes a moonroof moveable between an open position and a closed position, and a climate control system selectively operable in a recirculation mode. A controller of the system is configured such that, in response to a condition indicative of poor air quality in an environment outside the motor vehicle, the controller isolates an interior of the motor vehicle from the environment by commanding each of the power windows to move to the closed position, commanding the moonroof to move to the closed position, and commanding the climate control system to operate in the recirculation mode.

A method according to another exemplary aspect of the present disclosure includes, among other things, isolating an interior of a motor vehicle from an environment outside the motor vehicle based on either a selected drive mode or a detected location.

In a further non-limiting embodiment of the foregoing method, the isolating step occurs when either the selected drive mode is a drive mode corresponding to off-roading or the detected location is an off-roading area.

In a further non-limiting embodiment of any of the foregoing methods, the isolating step includes either commanding a climate control system of the motor vehicle to operate in a recirculation mode or commanding a power window of the motor vehicle to close.

In a further non-limiting embodiment of any of the foregoing methods, the isolating step includes both of commanding a climate control system of the motor vehicle to operate in a recirculation mode and commanding all power windows of the motor vehicle to close.

In a further non-limiting embodiment of any of the foregoing methods, the method includes using a neural network to monitor operation of the motor vehicle to learn conditions associated with poor air quality, and using the neural network to train a controller to automatically isolate the interior of the motor vehicle based on the learned conditions.

In a further non-limiting embodiment of any of the foregoing methods, the isolating step is performed based on received environmental data.

DETAILED DESCRIPTION

This disclosure relates to a system and method for isolating an interior of a motor vehicle from poor outdoor air quality. More particularly, this disclosure relates to a system and method configured to identify conditions associated with poor outdoor air quality and to respond to those conditions by isolating the interior of the motor vehicle from the outdoor environment. An example system includes a selector configured to permit a user to select a drive mode of the motor vehicle, a location system configured to detect a location of the motor vehicle, and a controller configured to issue one or more commands to isolate an interior of the motor vehicle from an environment outside the motor vehicle based on either a selected drive mode or a detected location. Among other benefits, this disclosure provides for improved air quality inside the motor vehicle. This disclosure is particularly useful when the vehicle is being used for off-roading, which is an activity known to kick up excess dust near the vehicle, as this disclosure prevents ingress of such dust into the vehicle interior. This disclosure has applications outside of off-roading, however. These and other benefits will be appreciated from the following description.

Figure 1:
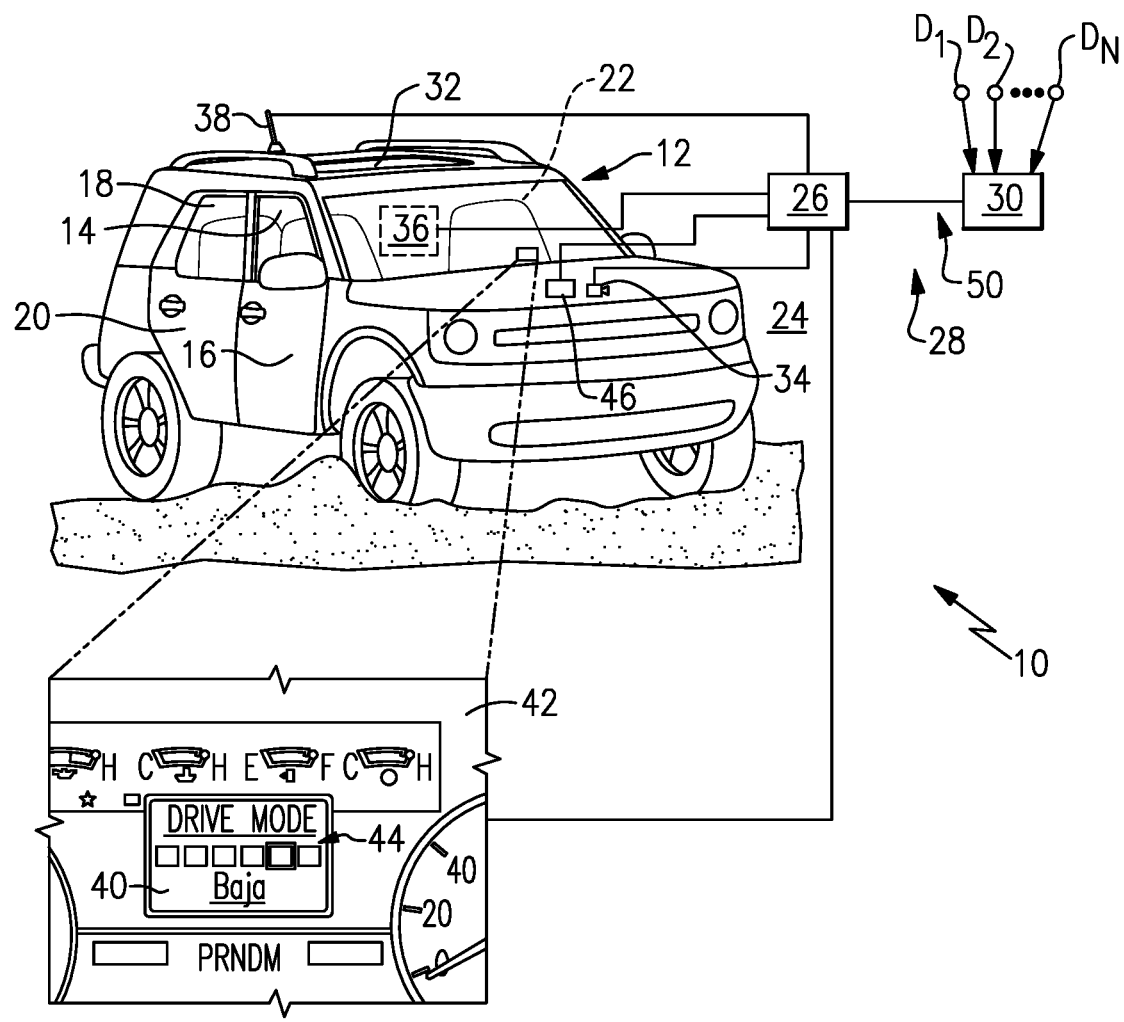
FIG. 1 schematically illustrates a system according to this disclosure. Further, in FIG. 1, a vehicle is off-roading.

FIG. 1 illustrates an example system 10 for isolating an interior of a motor vehicle 12 ("vehicle 12") from an outside environment. In addition to the vehicle 12, the example system 10 includes a number of other components, which will be discussed below, and which are used to identify conditions associated with poor air quality and which are configured to respond to those conditions in order to isolate the interior of the vehicle 12 in order to preserve the air quality within the vehicle 12.

The vehicle 12 is shown from a front-perspective view, and specifically illustrates a side referred to as a passenger side in regions such as the United States of America. The vehicle 12 is especially suited for off-roading. In particular, the vehicle 12 is a sport utility vehicle (SUV) and, in FIG. 1, is actively off-roading. More specifically, the vehicle 12 is being driven on a sand surface and is kicking up dust. While an SUV is shown, the vehicle 12 could be another type of vehicle suited for use off-road, such as a pickup truck. This disclosure applies to vehicles that are not especially suited for off-roading, such as sedans, cars, SUVs, trucks, vans, etc.

The vehicle 12 includes a plurality of power windows associated with the doors of the vehicle 12. In FIG. 1, a first power window 14 is associated with a front passenger door 16 of the vehicle 12, and a second power window 18 is associated with a rear passenger door 20. While only the passenger-side power windows and doors are visible in FIG. 1, the driver side of the vehicle 12 includes a similar arrangement of doors and power windows. Specifically, the vehicle 12 includes a total of four side doors configured for use by occupants entering and exiting the vehicle 12, and each side door includes a power window. The vehicle 12 also includes a rear door or liftgate, which does not include a vertically moveable power window in this example. This disclosure extends to vehicles having one or more doors and power windows.

The first and second doors 16, 20 are configured to open and close to selectively provide access and restrict access, respectively, to an interior 22 of the vehicle 12. Here, the interior 22 of the vehicle includes the passenger compartment or cabin, where the occupants (i.e., the passengers and driver) of the vehicle 12 sit. In some SUVs with cargo areas in the same compartment as the passenger cabin, the interior 22 also includes those cargo areas. The term interior 22 does not refer to trunks, for example, or the cargo beds of pickup trucks, which are separated from the passenger compartments of those vehicles.

The first and second power windows 14, 18 are vertically moveable by a corresponding drive assembly between an open position and a closed position. In an open position, the first and second power windows 14, 18 are at least partially lowered and at least partially arranged within a panel of a respective door 16, 20 to provide an opening, or gap, between the interior 22 and an outside environment 24. The outside environment 24, in this disclosure, refers to the area immediately outside the vehicle 12. As such, the conditions of the outside environment 24 are the prevailing conditions of the outside environment 24, including air quality conditions, experienced by the vehicle 12. When the first and second power windows 14, 18 are in the closed position, the first and second power windows 14, 18 are fully raised vertically and provide a barrier, specifically a fluid barrier, between the interior 22 of the vehicle 12 and the outside environment 24.

The first and second power windows 14, 18 are moveable between the open and closed positions in response to commands from a controller 26. The controller 26 includes electronics, software, or both, to perform the necessary control functions for operating the vehicle 12 and executing various functions of the system 10. In one non-limiting embodiment, the controller 26 is a combination vehicle system controller and powertrain control module (VSC/PCM). Although it is shown as a single hardware device, the controller 26 may include multiple controllers in the form of multiple hardware devices, or multiple software controllers within one or more hardware devices.

The controller 26 is part of an overall computing system 28 of the system 10. In addition to the controller 26, the computing system 28 includes an artificial neural network 30 ("neural network 30"). The neural network 30 may be incorporated in or interfaced with the vehicle 12. Alternatively or in addition, the neural network 30 may be embodied in whole or in part on a cloud based service.

The neural network 30 is configured to receive and process a plurality of different types of data $D_1$-$D_N$, where "N" represents any number. The neural network 30 may be a deep generative neural network, which is alternatively referred to as a flow model neural network. The neural network 30 provides a framework for machine learning. Specifically, the neural network 30 is trained to predict how various data inputs (i.e., from the data $D_1$-$D_N$) relate to poor air quality conditions in which the interior 22 of the vehicle 12 may need to be fluidly isolated from the outside environment 24. A neural network 30 is not required in all examples.

In addition to the power windows associated with the doors, the vehicle 12 also includes a moonroof 32. The moonroof 32 is moveable between an open position and a closed position. In a closed position, the moonroof 32 provides a fluid barrier between a top of the vehicle 12 and the outside environment 24. The moonroof 32 is moveable, and in particular slidable forward and backwards, via a drive assembly which is responsive to commands from the controller 26. A moonroof 32 is not required in all examples. Further, alternatively, the moonroof 32 could be a sunroof in some examples. The moonroof 32 is representative of any moveable panel adjacent a top of the vehicle 12.

The vehicle 12 further includes a camera 34. In this example, the camera 34 is mounted adjacent a front of the vehicle 12 and is configured to capture images, such as still images and/or video, of an area adjacent a front of the vehicle 12. The camera 34 could be mounted elsewhere on the vehicle 12, however, and could capture images of areas adjacent other sides of the vehicle 12. Further, the vehicle 12 could include more than one camera. Alternatively, this disclosure extends to vehicles that do not include a camera. The camera could be part of an existing system of the vehicle, such as rear backup camera, a self-driving system (SDS) of the vehicle 12, a front camera, a 360° camera, etc. The camera 34 could be provided by a sensor of the SDS, such as a laser imaging, detection, and ranging (LIDAR) sensor. The camera 34 is electrically connected to the controller 26, such that the controller 26 has access to images captured by the camera 34.

The vehicle 12 further includes a climate control system 36. The climate control system 36 may be referred to as a heating, ventilation, and air conditioning (HVAC) system. The climate control system 36 is configured to provide the interior 22, and in particular the passenger compartment, with a desired temperature and humidity. The climate control system 36 includes a blower, or ventilation fan, which is powered by an electric motor, and is configured to force air through ducting into the interior 22. The air supplied to the interior 33 may be either ambient air from the outside environment 24 or air that is recirculated from the interior 22. When the climate control system 36 supplies recirculated air to the interior 22, the climate control system 36 is operating in a recirculation mode. Vehicle occupants may select between a fresh air mode and a recirculation mode using a manual switch or button. The climate control system 36 is responsive to commands from the controller 26. In particular, the controller 26 is configured to selectively command the climate control system 36 to operate in recirculation mode.

The vehicle 12 also includes a transceiver 38. The transceiver 38 is configured to send and receive communications relative to the vehicle 12. The transceiver 38 is responsive to commands from the controller 26 and is configured to relay received information to the controller 26. The transceiver 38 may also be electrically connected to the neural network 30 and one or more other remote servers.

The vehicle 12 also includes a powertrain, which includes the main components, such as the engine, transmission, drive shafts, differentials, etc., that generate power and deliver power to the road surface, or in the case of off-roading, the ground surface. The powertrain may include an internal combustion engine and/or one or more electric machines. In this regard, the vehicle 12 may be a hybrid electric vehicle (HEV), a battery electric vehicle (BEV), plug-in hybrid electric vehicles (PHEVs), or may be powered only by an internal combustion engine.

The vehicle 12 is operable in more than one drive mode, in this example. The various drive modes of the vehicle 12 may be selected by a user, such as the driver of the vehicle 12, via a selector 40. An example selector 40 is illustrated in the call-out of FIG. 1. In particular, FIG. 1 illustrates a portion of a human-machine interface (HMI) 42, which in this example is a portion of a dashboard. The HMI 42 could be part of an infotainment system or other system of the vehicle 12. A user can use the selector 40, which may be displayed to the user via the HMI 42, to select a drive mode. The selector 40 displays a plurality of drive modes 44 to the user. The user may use an input mechanism, such as a button on a touch screen, a button of the infotainment system, and/or a button on the steering wheel of the vehicle 12, to select a particular one of the drive modes 44. Reference to the selector 40 herein includes the portion of the HMI 42 and/or the input mechanism used by the user to make the drive mode selection. In this example, there are six available drive modes 44. This disclosure extends to vehicles having one or more drive modes.

The controller 26 is responsive to the various drive modes 44 to alter the manner in which the powertrain of the vehicle 12 operates. For instance, the drive modes 44 are essentially presets for different systems and components of the vehicle 12, including driver assist and stability control systems, steering feel, throttle and transmission mapping, braking modes, the locking differential, etc. The drive modes 44, in particular, can alter the sensitivity of the throttle pedal, the amount of fuel supplied to the engine, the amount of computer traction available, and the suspension settings. These variations may be altered together or separately to change how the vehicle 12 drives and feels. Common drive modes 44 include a sport mode, eco mode, comfort mode, snow mode, etc.

At least one mode of the vehicle 12 may directly or indirectly relate to off-roading. One such mode offered on some Ford Motor Company vehicles, such as a pickup truck known as the F-150 Raptor, is known as Baja mode. In Baja mode, the controller 26 controls the vehicle 12 such that it is especially suited for high-speed driving on a sandy surface, with a throttle map and traction control settings designed to give more power and increased engine response, as well as quicker shifts and a transmission that will hold gears longer into their high RPM ranges. Another example off-roading mode, also offered on some Ford Motor Company vehicles, is Rock Crawl. In Rock Crawl mode, the vehicle 12 engages the electronic locking differential, and sets the traction control system to its least restrictive settings. Further, the throttle and transmission settings are mapped for the greatest control, and the camera (i.e., the camera 34) located adjacent the front of the vehicle 12 can be kept on at speeds of up to 15 mph so the user (i.e., the driver) can see the terrain immediately in front of the vehicle 12. The Baja and Rock Crawl modes are examples of drive modes 44 that are directly or indirectly associated with off-roading, as a user typically selects those modes when using the vehicle 12 for off-roading. In FIG. 1, the user has selected Baja mode and is driving the vehicle 12 on a sand surface.

The vehicle 12 further includes a location system 46 configured to detect a location of the vehicle 12. The location system 46 may be a global positioning system (GPS), a wireless communication system (such as a radio-frequency identification system), or a camera-based, shape detection system. The location system 46 may also be configured to make the vehicle 12 a location-aware device, such that the location system 46 can determine whether the vehicle 12 has entered or exited a geofence, which is a virtual perimeter for a real-world geographic area. The location system 46 is electrically connected to the controller 26 and is configured to relay information pertaining to the location of the vehicle 12 to the controller 26. The location system 46 may also receive and/or send location information via the transceiver 38.

A controller area network (CAN) 50 allows the controller 26 to communicate with the various component of the system 10, including the components of the vehicle 12. Various connections of the CAN 50 are represented using lines in FIG. 1.

The system 10 is configured to identify or predict conditions where the air quality of the outside environment 24 is relatively poor. In those conditions, which are referred to herein as poor air quality conditions, the system 10 is configured to take one or more actions to fluidly isolate the interior 22 of the vehicle 12 from the outside environment 24. Example actions that fluidly isolate the interior 22 include moving the power windows 14, 18 to the closed position, moving the moonroof 32 to the closed position, and/or operating the climate control system 36 in the recirculation mode. The system 10 may perform each of the aforementioned actions simultaneously in response to an identified or predicted poor air quality condition. The system 10 may perform additional actions that fluidly isolate the interior 22 in addition to or as an alternative to the aforementioned actions.

In this disclosure, a poor air quality condition is a condition indicative of air being degraded by one or more impurities, contaminants, and/or pollutants such as smoke (either from a fire or tire burnout, as examples), dust, smog, particulate matter, ragweed, pollen, etc. A poor air quality condition may include excess dust kicked up by the vehicle 12 as the vehicle 12 is off-roading on a sand trail. A poor air quality condition may also be indicated by a standardized scale, such as an Air Quality Health Index ranking, which is typically a numerical value between 1-10, with higher numbers associated with lower air quality. In addition to a potential health concern, in which some portions of the population may experience symptoms such as coughing and/or throat irritation, a poor air quality condition may dirty the vehicle 12, including the interior 22 of the vehicle 12, such that excess cleaning of the vehicle 12 is required.

Example poor air quality conditions are discussed below, and may be programmed into the controller 26 and/or learned over time. The system 10 may use, together or separately, a number of techniques to identify conditions indicative of poor air quality in the outside environment 24. These conditions are either directly indicative of current poor air quality of the outside environment 24 or are used to predict that there will be poor air quality at a future time and/or location. While a number of example techniques are described below, the system 10 may use other techniques.

Figure 2:
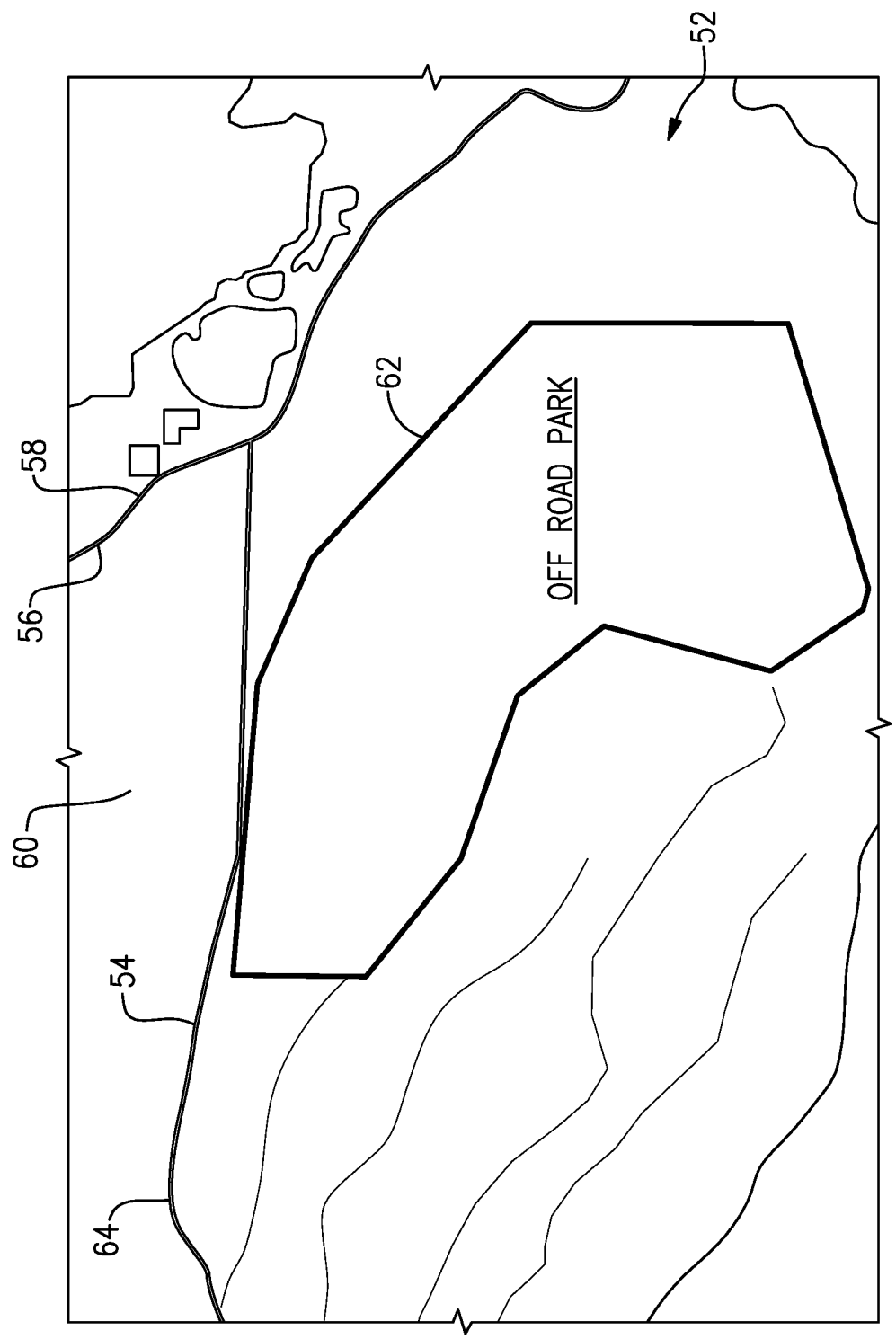
FIG. 2 is an example map illustrating a plurality of roadways and a geofenced area.

FIG. 2 illustrates a map 52. The map 52 may be stored on or accessed by the location system 46 and/or the controller 26. The location system 46 is configured to determine a location of the vehicle 12 relative to the map 52. The map 52 includes a plurality of roads. A first road 54 is a paved road. Another road, 56, is an unpaved road provided by a dirt and/or gravel surface.

An aspect of this disclosure relates to identifying when the vehicle 12 has departed a paved road. In response, the controller 26 determines that the air quality of the outside environment 24 will deteriorate as the vehicle 12 kicks up dust associated with an unpaved road. In a particular example, the vehicle 12 is at location 58 on the unpaved road 56. In another example, the vehicle 12 is at a location 60, which is not on any identified road. The location 60 is at a predetermined distance, such as 20 feet, from an identified road. In response to either of these example scenarios, the controller 26 will issue one or more commands to isolate the interior 22.

In another aspect of this disclosure, a geofence 62 is established around an off-roading park. The off-roading park may be a public or private area including trails and/or terrain that driving enthusiasts may use for off-roading. One example park is Holly Oaks ORV Park in Holly, Mich. The location system 46 is configured to issue signals to the controller 26 indicative of the vehicle 12 entering and exiting the geofence 62. As the vehicle 12 enters the off-road park by breaching the perimeter of the geofence 62, the controller 26 will issue one or more commands to isolate the interior 22.

In another aspect of this disclosure, the controller 26 issues one or more commands to isolate the interior when a user selects a drive mode 44 corresponding to off-roading, such as the Baja or Rock Crawl modes discussed above.

In another aspect, the controller 26 is configured to identify a poor air quality condition based on an image from the camera 34. Specifically, the controller 26 may be configured to identify various objects or events occurring in the vicinity of the vehicle 12. Example objects include garbage trucks, construction vehicles, vehicles such as diesel vehicles known to produce excess exhaust, farms such as livestock operations (which may produce an unpleasant scent), plants, factories, paper mills, refineries, etc. Example events include occurrences of dust, smoke, exhaust, fog, flames, etc. The controller 26 is configured to analyze still and/or video images from the camera 34 using known techniques, such as by manipulating the color spectrum of the images, to identify certain objects and/or events corresponding with a poor air quality condition. The images can be decomposed into a simple matrix and then be manipulated using matrix operations. The images, specifically, can be transferred to the CIELAB color space, in one example. Analyzing the images in this manner leads to repeatable and reliable results and does not require undue processing power. The images can be analyzed using other known techniques in order to identify a poor air quality condition.

When the controller 26 identifies an object or event associated with a poor air quality condition based on an image from the camera 34, in an aspect of this disclosure the controller 26 commands the transceiver 38 to report the event/object to a remote server, along with the location of the subject event/object, such that other vehicles may benefit from the identified poor air quality condition. For instance, if the controller 26 identifies a construction site emitting undue amounts of dust along the road 54, that information may be useful to other vehicles. The remote server can save that information and selectively disseminate it to other vehicles and/or to other services, such as a weather reporting service or service providing the public with an air quality index. The transceiver 38 can also communicate that information to another, nearby vehicle directly using vehicle-to-vehicle (V2V) communication.

The transceiver 38 is also configured to receive environmental data, such as weather data and/or air quality data, corresponding to a current location or an expected location, based on a planned trip for example, of the vehicle 12. The transceiver 38 may receive such information from a weather service, a remote server, or another vehicle (e.g., using V2V communication). The controller 26 is configured to issue one or more commands to isolate the interior 22 when the received environmental data indicates a poor air quality condition.

In another aspect of the disclosure, the neural network 30 is configured to monitor operation of the vehicle 12 over time to learn conditions associated with poor air quality. In particular, the neural network 30 monitors and receives a plurality of data $D_1$-$D_N$ and attempts to learn, over time, that a user of the vehicle 12, for example, typically fluidly isolates the interior 22 by manually rolling up the windows and/or activating a recirculation mode in particular locations or under certain conditions. For instance, if nearly every day for a month the user fluidly isolates the interior as the vehicle 12 passed location 64 on the map 52, the neural network 30 will learn that location 64 is associated with poor air quality. For example, there may be a construction site at or near location 64. Alternatively, there may be a factory creating an unpleasant smell at or near location 64. The source of the smell, in some examples, may be difficult to detect using the camera 34, as it may be hidden from view of the road or upwind of the location 64. Regardless, over time, the neural network 30 will associate the location 64 with a poor air quality condition and will train the controller 26 to automatically isolate the interior 22 as the vehicle 12 approaches location 64. Over time, the poor air quality at location 64 may resolve, and the neural network 30 may learn of the resolution of the poor air quality condition by repeated overrides by the user, for example.

In this respect, the system 10 may provide a notice or prompt, via the HMI 42 for example, to a user indicating that a poor air quality condition has been identified and that the vehicle 12 will automatically isolate the interior 22. The prompt may include a countdown and may permit the user to override the isolation of the interior 22 during the countdown if the user does not desire the power windows 14, 18 to close, moonroof 32 to close, and/or for the climate control system 36 to enter into a recirculation mode. The user may desire the windows of the vehicle 12 to be open while off-roading in order to increase visibility, as one example.

Directional terms such as "vertical," "upward," "downward," "forward," "rearward," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system for a motor vehicle, comprising:
a selector configured to permit a user to select a drive mode of the motor vehicle;
a location system configured to detect a location of the motor vehicle; and
a controller configured to issue a command to isolate an interior of the motor vehicle from an environment outside the motor vehicle based on either a selected drive mode or a detected location.

2. The system as recited in claim 1, wherein the controller is configured to issue a command to isolate the interior of the motor vehicle based on either a user selecting a drive mode corresponding to off-roading or the detected location corresponding to an off-roading area.

3. The system as recited in claim 1, further comprising:
a climate control system of the motor vehicle selectively operable in a recirculation mode, and
wherein the controller is configured to issue a command to cause the climate control system to operate in the recirculation mode based on either the selected drive mode or the detected location.

4. The system as recited in claim 1, further comprising:
a power window configured to move between an open position and a closed position, and
wherein the controller is configured to issue a command to cause the power window to move to the closed position based on either the selected drive mode or the detected location.

5. The system as recited in claim 4, wherein the power window is either a window of a side door of the motor vehicle or a moonroof.

6. The system as recited in claim 4, wherein:
the power window is one of a plurality of power windows each associated with an individual side door of the motor vehicle,
the motor vehicle further includes a moonroof configured to move between an open position and a closed position, and
the controller is configured to issue a command to cause each of the power windows and the moonroof to move to the closed position based on either the selected drive mode or the detected location.

7. The system as recited in claim 1, further comprising:
a camera,
wherein the controller is configured to issue a command to isolate the interior of the motor vehicle based on an image from the camera indicating a poor air quality condition.

8. The system as recited in claim 7, further comprising:
a transceiver, and
wherein the transceiver is configured to send information corresponding to the poor air quality condition.

9. The system as recited in claim 1, wherein the controller is configured to issue a command to isolate the interior of the motor vehicle when the detected location includes a designated off-roading area.

10. The system as recited in claim 9, wherein the location system is configured to detect that the motor vehicle has entered a geofence corresponding to the off-roading area.

11. The system as recited in claim 1, wherein the controller is configured to issue a command to isolate the interior of the motor vehicle when the detected location exceeds a predetermined maximum threshold distance from a mapped roadway.

12. The system as recited in claim 1, further comprising:
a neural network configured to monitor operation of the motor vehicle over time to learn conditions associated with poor air quality, and
wherein the neural network is configured to train the controller to selectively isolate interior of the motor vehicle based on the learned conditions.

13. The system as recited in claim 1, further comprising:
a transceiver configured to receive environmental data,
wherein the controller is configured to identify a poor air quality condition based on the received environmental data and to issue a command to isolate the interior of the motor vehicle based on the identified poor air quality condition.

14. A system for a motor vehicle, comprising:
a plurality of power windows, each of the power windows associated with an individual side door of the motor vehicle and moveable between an open position and a closed position;
a moonroof moveable between an open position and a closed position;
a climate control system selectively operable in a recirculation mode; and
a controller, wherein, in response to a condition indicative of poor air quality in an environment outside the motor vehicle, the controller is configured to isolate an interior of the motor vehicle from the environment by commanding each of the power windows to move to the closed position, commanding the moonroof to move to the closed position, and commanding the climate control system to operate in the recirculation mode.

15. A method, comprising:
isolating an interior of a motor vehicle from an environment outside the motor vehicle based on either a selected drive mode or a detected location.

16. The method as recited in claim 15, wherein the isolating step occurs when either the selected drive mode is a drive mode corresponding to off-roading or the detected location is an off-roading area.

17. The method as recited in claim 15, wherein the isolating step includes either commanding a climate control system of the motor vehicle to operate in a recirculation mode or commanding a power window of the motor vehicle to close.

18. The method as recited in claim 15, wherein the isolating step includes both of commanding a climate control system of the motor vehicle to operate in a recirculation mode and commanding all power windows of the motor vehicle to close.

19. The method as recited in claim 15, further comprising:
using a neural network to monitor operation of the motor vehicle to learn conditions associated with poor air quality; and
using the neural network to train a controller to automatically isolate the interior of the motor vehicle based on the learned conditions.

20. The method as recited in claim 15, wherein the isolating step is performed based on received environmental data.

* * * * *